United States Patent
Sugino

[11] 3,919,898
[45] Nov. 18, 1975

[54] ADJUSTABLE BICYCLE CRANK ASSEMBLY WITH PRELOADED BEARINGS AND COTTERLESS CRANKS

[75] Inventor: Yasushi Sugino, Ikoma, Japan

[73] Assignee: Sugino Cycle Industries, Ltd., Osaka, Japan

[22] Filed: Dec. 20, 1973

[21] Appl. No.: 426,556

[30] Foreign Application Priority Data
Mar. 13, 1973  Japan................................ 48-32161

[52] U.S. Cl. ............ 74/594.2; 308/23.5; 308/179.5; 308/192; 308/189 A
[51] Int. Cl.[2]...................... F16C 13/06; F16C 9/00; F16C 25/06
[58] Field of Search......... 308/179.5, 189 R, 189 A, 308/191, 192, 23.5; 74/594.1, 594.2, 23.5

[56] References Cited
UNITED STATES PATENTS

| | | | |
|---|---|---|---|
| 533,341 | 1/1895 | Boyle ..................... | 308/192 |
| 572,003 | 11/1896 | Green .................... | 308/192 |
| 574,700 | 1/1897 | Auberlin ................ | 308/192 |
| 576,661 | 2/1897 | Douglas ................. | 308/192 |
| 652,865 | 7/1900 | Scovill .................. | 74/594.2 |
| 743,843 | 11/1903 | Elliott ................... | 308/192 |
| 1,104,523 | 7/1914 | McIlwaine ............ | 308/179.5 |
| 3,347,112 | 10/1967 | Thun ..................... | 74/594.2 |
| 3,648,542 | 3/1972 | Perotti et al. ......... | 74/594.1 |

FOREIGN PATENTS OR APPLICATIONS
598,673   10/1959   Italy................................. 74/594.2

Primary Examiner—Samuel Scott
Assistant Examiner—Allan R. Burke
Attorney, Agent, or Firm—Armstrong, Nikaido & Wegner

[57] ABSTRACT

A driving assembly comprising a bracket axle having screw rods extending from its opposite ends respectively and tapered portions each positioned inwardly of each screw rod, race members mounted on the bracket axle against axial displacement and each positioned inwardly of the tapered portion, ball retainers opposing the race members respectively to retain balls therebetween, an axle housing holding the ball retainers therein to accommodate the bracket axle in rotatable manner, and right and left cranks each having at its head a tapered hole and a recess communicating therewith, one of the cranks fixedly carrying at least one sprocket. The tapered portions of the axle fit in the tapered holes of the cranks, with the planar surfaces of the tapered portions in fitting engagement with the planar surfaces defining the tapered holes so as to render the axle and cranks rotatable together. These members are fastened together by nuts screwed onto the screw rods positioned in the recesses.

2 Claims, 5 Drawing Figures

ADJUSTABLE BICYCLE CRANK ASSEMBLY WITH PRELOADED BEARINGS AND COTTERLESS CRANKS

BACKGROUND OF THE INVENTION

The present invention relates to a driving assembly for bicycles comprising a bracket axle, a housing therefor, right and left cranks and sprockets.

As well known, the driving assembly for bicycles of any type designed for racing, sports or general purposes mainly consists of a bracket axle, an axle housing, right and left cranks and at least one sprocket. It is also known that driving assemblies presently in use are of two types: the single piece crank type in which the bracket axle and cranks are in the form of one integral piece and the so-called cotterless crank type which is built by securing the right and left cranks to the bracket axle as is the case with the cotter type.

With reference to FIG. 1, the bicycle driving assembly of the single piece crank type will be described. Left and right cranks 1, 2 are integral with a bracket axle 3 having opposite ends which are threaded as at 4, 5 in their peripheral surfaces. Race members 6, 7 are screwed onto the threaded portions 4, 5, while an axle housing 10 is provided with cuplike ball retainers 11, 12 at its opposite ends. Balls 8, 9 are placed between the race members 6, 7 and the ball retainers 11, 12 so as to render the bracket axle 3 and cranks 1, 2 rotatable relative to the axle housing 10.

Generally at one end of the bracket axle 2 from which the right crank 2 extends, there are provided an inner sprocket 13, an outer sprocket 14 and a protector 15, so that the right crank 2 must be formed with a projection 16 or the like to be fitted in the inner sprocket 13.

Thus, because the cranks are integral with the bracket axle, the single piece crank type has the advantage of including a smaller number of components and being free of the necessity to join the cranks with the axle, but it involves various problems. For example, the integral piece must be made by forging; it is difficult to make the threaded portions 4, 5 with high accuracy; the parts are difficult to assemble although they can be assembled in limited sequence by a reduced number of assembling steps; it is virtually impossible to replace the inner sprocket; and the assembly needs overhauling when a part should be broken or damaged and is therefore uneconomical and requires an increased dead space for this purpose.

According to the construction of the cotterless crank type illustrated in FIG. 2, a bracket axle 3 has opposite tapered ends 17, 18 adapted to fit in tapered holes 19, 20 formed in the heads of left and right cranks 1, 2 respectively. The axle 3 has ball retainers 11, 12 formed integrally therewith. Race members 6, 7 are screwed into an axle housing 10. To secure the left and right cranks 1, 2 to the axle 3, bolts 27, 28 are screwed into bores 21, 22 having female threads and formed in the tapered ends 17, 18 of the axle 3 coaxially therewith, with bolt heads 25, 26 fitted in recesses 23, 24 in the cranks, the recesses 23, 24 communicating with the tapered holes 19, 20 respectively. Usually, by virtue of planar surfaces 29, 30, the cranks 1, 2 are rotatable with the axle 3.

Although the cotterless type described is disadvantageous in that it includes an increased number of parts and that the cranks must be connected to the bracket axle, the parts can be assembled or separated from the right side or the left side and separation of the crank from the axle permits replacement of the sprocket as desired, since the cranks and the axle are of the assembly type. Accordingly, the driving assembly of this type has the advantage of overcoming the drawbacks of the single piece crank type.

However, it is noted that the conventional cotterless type has the ball retainers formed integrally with the bracket axle having opposite ends of the same diameter and race members which are invariably screwed into the axle housing, with the result that the housing portion is made compact. Moreover, the housing portion serves as a junction of the frame of bicycle. Consequently, the cotterless type has a disadvantage in that it is adapted for use in small-sized bicycles. In addition, the bracket axle must be formed with female screw threads for screwing the bolts to connect the cranks to the axle, this entailing problems in the manufacturing procedure and the strength of the construction.

SUMMARY OF THE INVENTION

The present invention has been accomplished to enable the foregoing two types to mutually compensate for their drawbacks and enhance their advantages.

An object of this invention is to provide an inexpensive driving assembly for bicycles which includes improved bracket axle, race members and axle housing and in which the advantages of the cotterless type are utilized while the disadvantages thereof are overcome by a construction resembling the single piece crank type.

Another object of this invention is to provide a driving assembly for bicycles which is easy to make, assemble and separate and which has excellent durability.

Still another object of this invention is to provide an apparatus which is capable of driving bicycles properly, regardless of whether they are designed for racing, sports or general purposes and irrespective of whether small or large.

DESCRIPTION OF THE PREFERRED EMBODIMENT

Figure 1:
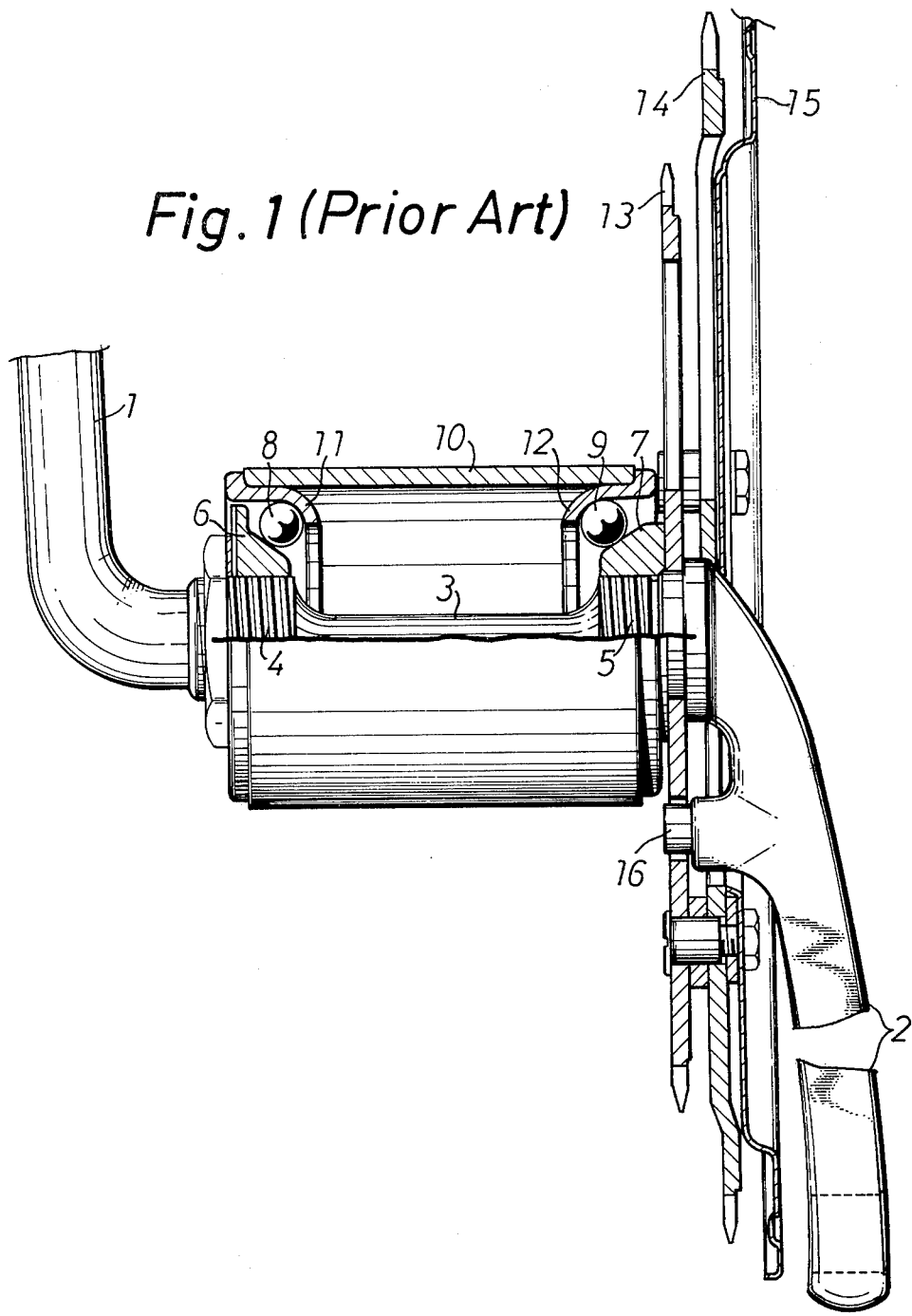
FIG. 1 is a sectional view showing a conventional driving assembly of the single piece crank type.
Figure 2:
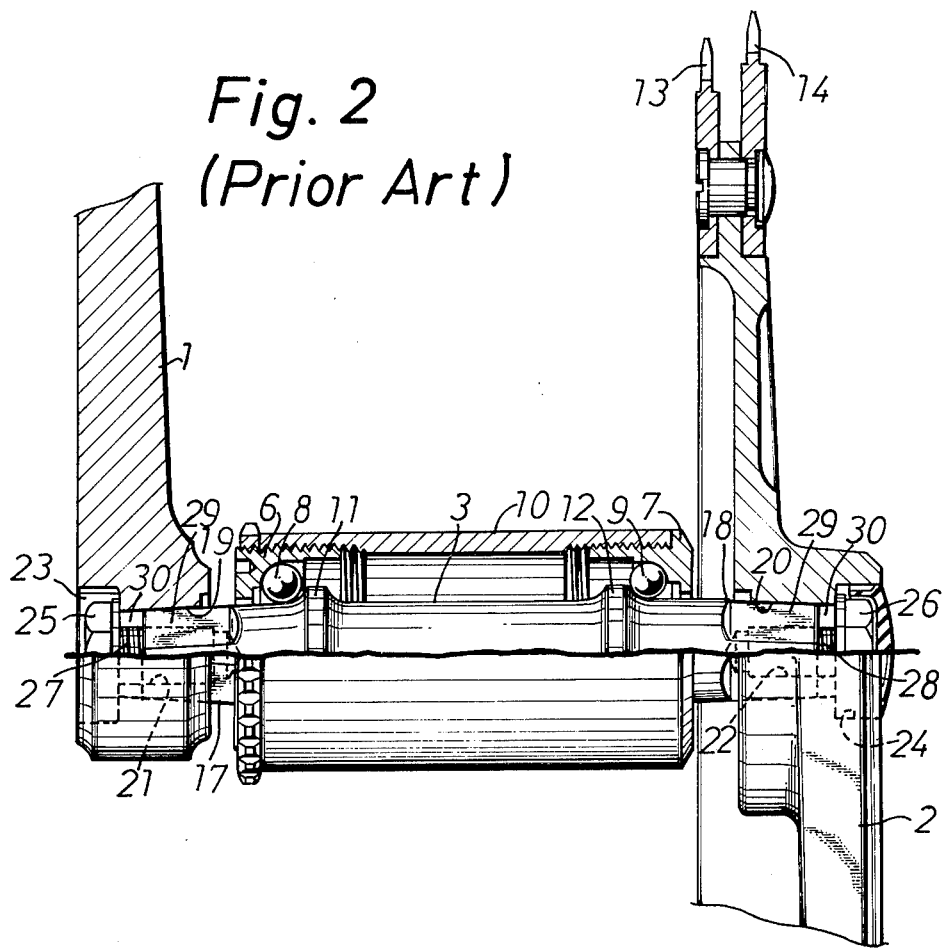
FIG. 2 is a sectional view showing a conventional driving assembly of the cotterless crank type.
Figure 3:
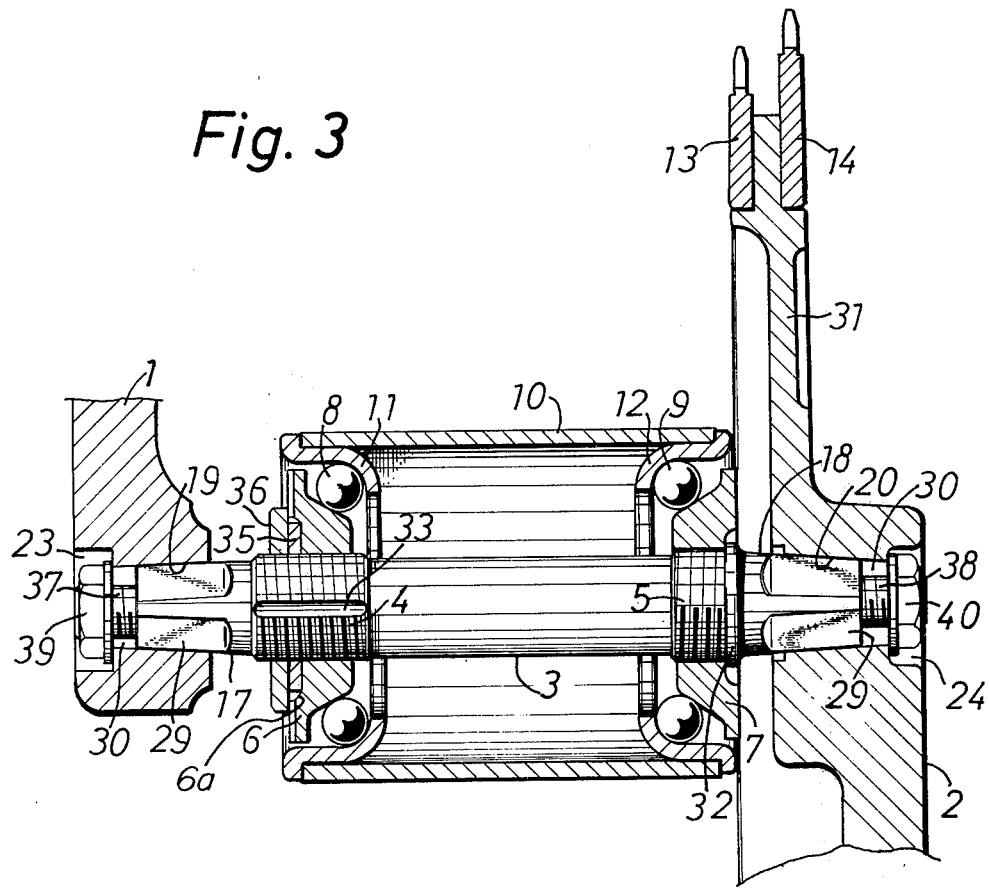
FIG. 3 is a sectional view of an embodiment of this invention.
Figure 4:
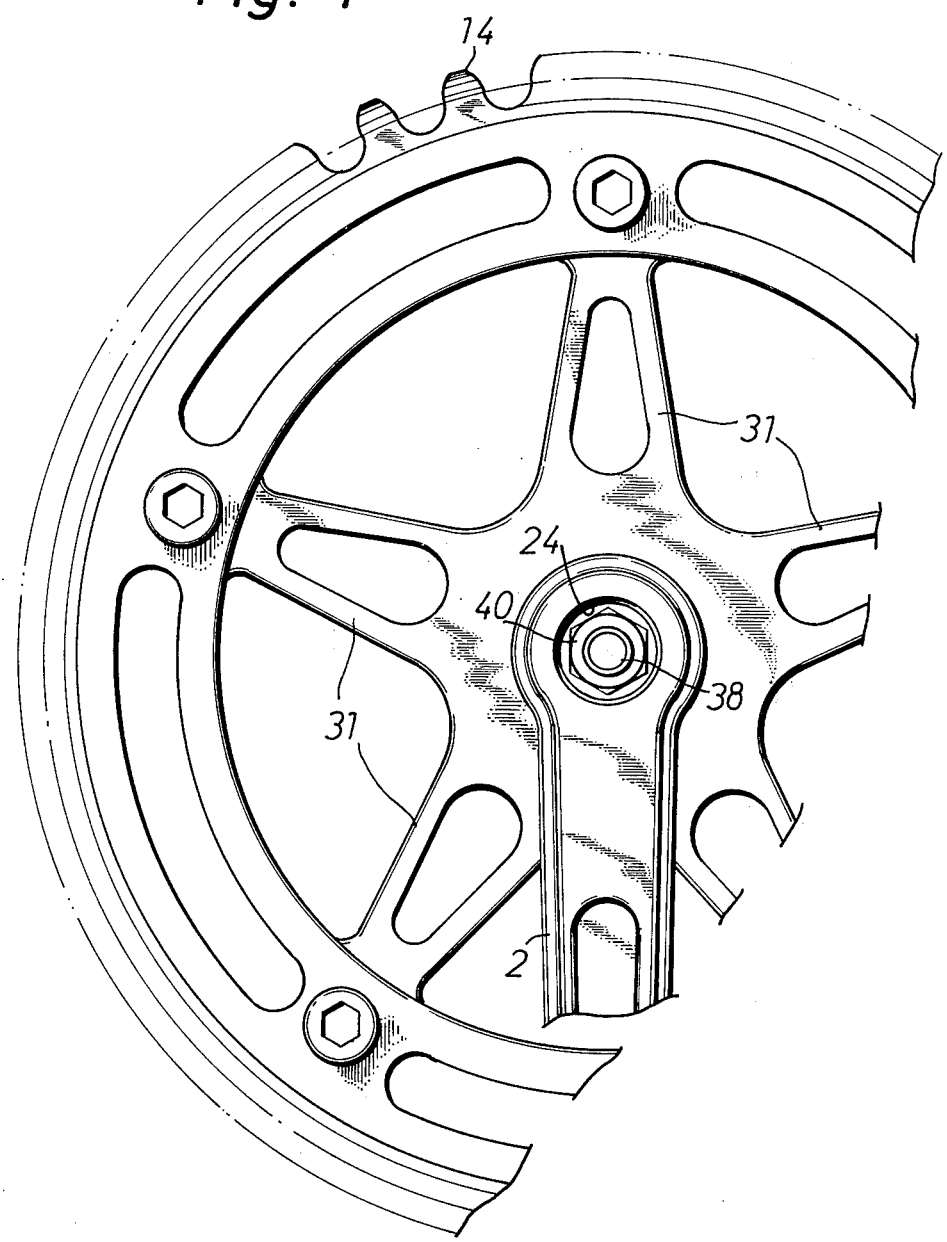
FIG. 4 is a fragmentary front view of the same.

With reference to FIGS. 3 and 4, a bracket axle 3 is provided toward its opposite ends with tapered portions 17, 18 having planar surfaces 29, 29 as in the conventional assembly. The tapered portions 17, 18 are adapted to fit in tapered holes 19, 20 of cranks 1, 2, the holes 19, 20 being defined by planar surfaces 30, 30 for fitting contact with the planar surfaces 29, 29. Like conventional construction, the cranks 1, 2 have recesses 23, 24 communicating with the tapered holes 19, 20. One of the cranks, i.e. usually the right crank 2, is integrally formed with radial arms 31 for mounting inner and outer sprockets 13, 14 as shown in FIG. 4.

The bracket axle 3 is formed, inwardly of its opposite ends, with threaded portions 4, 5 on which race members 6, 7 are screwed. Since it is only the bracket axle 3 that need by machined to form the threaded portions 4, 5, machining can be carried out with ease and with improved accuracy.

The threads in the portions 4, 5 are opposite-handed with respect to each other, and the threaded portion 5 on the sprocket side has a greater diameter than the other threaded portion 4. The threaded portion 5 has at its outer end a flange 32 for retaining the race member 7.

The threaded portion 4 is formed in its periphery with a groove 33 extending in the axial direction. A washer 35 having a projection 34 engaged in the groove 33 is positioned in contact with the outer side surface of the race member 6 in the recessed portion 6a. The race number 6 is screwed onto the threaded portion 4. A nut 36 is screwed onto the threaded portion 4 in pressing contact with the washer 35 so as to hold the race member 6 in position.

To mount the left and right cranks 1, 2 on the opposite ends of the axle 3 and fasten them together in cotterless fashion, the axle 3 is integrally provided at its opposite ends with screw rods 37, 38 which are adapted to be positioned in the recesses 23 and 24 without being exposed therefrom when nuts 39, 40 are screwed thereon to fasten the cranks to the axle.

Figure 5:
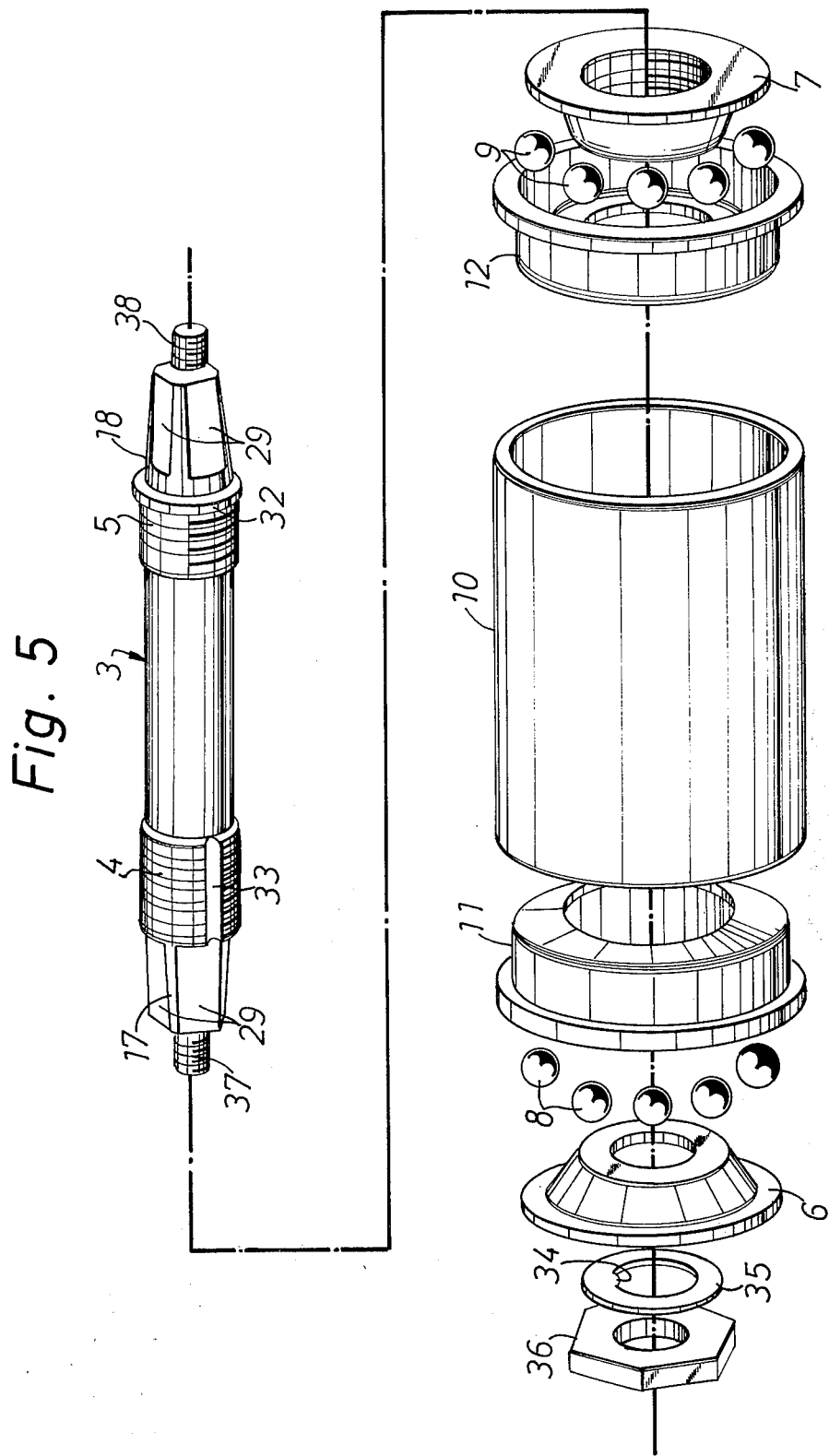
FIG. 5 is a perspective view showing how the embodiment is assembled.

The parts will be assembled in the manner described below with reference to FIG. 5. Inner and outer sprockets 13, 14 are fixed to the right crank 2. The race member 7 is placed onto the bracket axle 3 from the left side and screwed onto the threaded portion 5. The axle housing 10 is then placed around the axle 3 from the same side, with the balls 9 retained between the ball retainer 12 and the race member 7.

In the same direction as above, the race member 6 and the ball retainer 11 holding the balls 8 therebetween are placed onto the axle, and the washer 35 is fitted to the race member 6 with its projection 34 engaged in the groove 33. The nut 36 is then screwed onto the threaded portion 4, whereby the axle assembly is completly assembled. Subsequently, the tapered portions 17, 18 of the axle 3 are fitted into the tapered holes 19, 20 in the right and left cranks 1, 2, thereby rendering the axle and the cranks rotatable together by virtue of engagement between the planar surfaces 29 and 30. When the axle 3 and the cranks 1, 2 are fitted together, the screw rods 37, 38 are positioned in the recesses 23, 24. The nuts 39, 40 are screwed onto the rods.

Thus, instead of the threaded bores conventionally formed in the ends of the axle to connect the cranks to the axle, the axle according to this invention is provided with screw rods 37, 38 integrally formed with its ends and projecting into the recesses 23, 24, such that the nuts 39, 40 are screwed thereon to faasten the cranks to the axle. As a result, the construction permits the axle to have increased strength at its ends and does not require boring to form the threaded bores and assures easy and accurate thread cutting operation. The improved modifications in the shapes of the race members 6, 7, and the threaded portions 4, 5 of the bracket axle 3 make it possible to increase the size of the axle housing 10 and facilitate mounting of the bicycle frame, rendering the driving assembly adapted for use in large-sized bicycles. The rotation of the bracket axle 3 relative to the cranks 1, 2 is prevented by the planar surfaces 29, 30, which, along with the provision of an enlarged bearing construction, assures smooth driving operation. The present invention has further advantage of facilitating replacement of the sprocket and assembling and separation of all the parts and giving firm connection without using any cotter pin.

The present invention is of course applicable to a driving assembly including only one sprocket.

What is claimed is:

1. A driving assembly for a bicycle comprising a bracket axle provided with screw rods positioned at opposite ends thereof, tapered portions having planar portions positioned inwardly of each said screw rod and threaded portions positioned inwardly of said tapered portions, said screw portions having grooves therein extending in the axial direction; washers mounted on the screw portions of said bracket axle, said washers having a projection thereon which engages the grooves in said bracket axle, thereby preventing the rotation of said washers relative to said bracket axle; nuts screwed onto the threaded portion of said bracket axle for holding said washers and race members in fixed positions thereon; ball retainers opposing said race members and cooperative therewith to retain balls betwen said ball retainers and said race members; an axle housing holding said ball retainers and rotatably supporting said bracket axle therein; right and left cranks each having at its head a tapered hole for receiving said tapered portion of said bracket axle and a recess communicating with the tapered hole, the tapered hole being defined by planar surfaces fittingly engageable with the planar surfaces of said tapered portion, wherein said tapered portions of said bracket axle are fitted in said tapered holes of the right and left cranks such that said axle and cranks are rotatable together and said screw rods of said bracket axle are positioned in said recesses in the cranks, said bracket axle and said right and left cranks being fastened together by nuts inserted into the recesses and screwed onto the screw rods; and at least one sprocket fixed to one of said cranks.

2. The driving assembly of claim 1, wherein said race member has a recessed portion therein, said washer fitting into said recessed portion.

* * * * *